Nov. 24, 1931.  R. E. DRAWZ  1,833,831
COAL BURNING STOKER
Filed Aug. 13, 1928
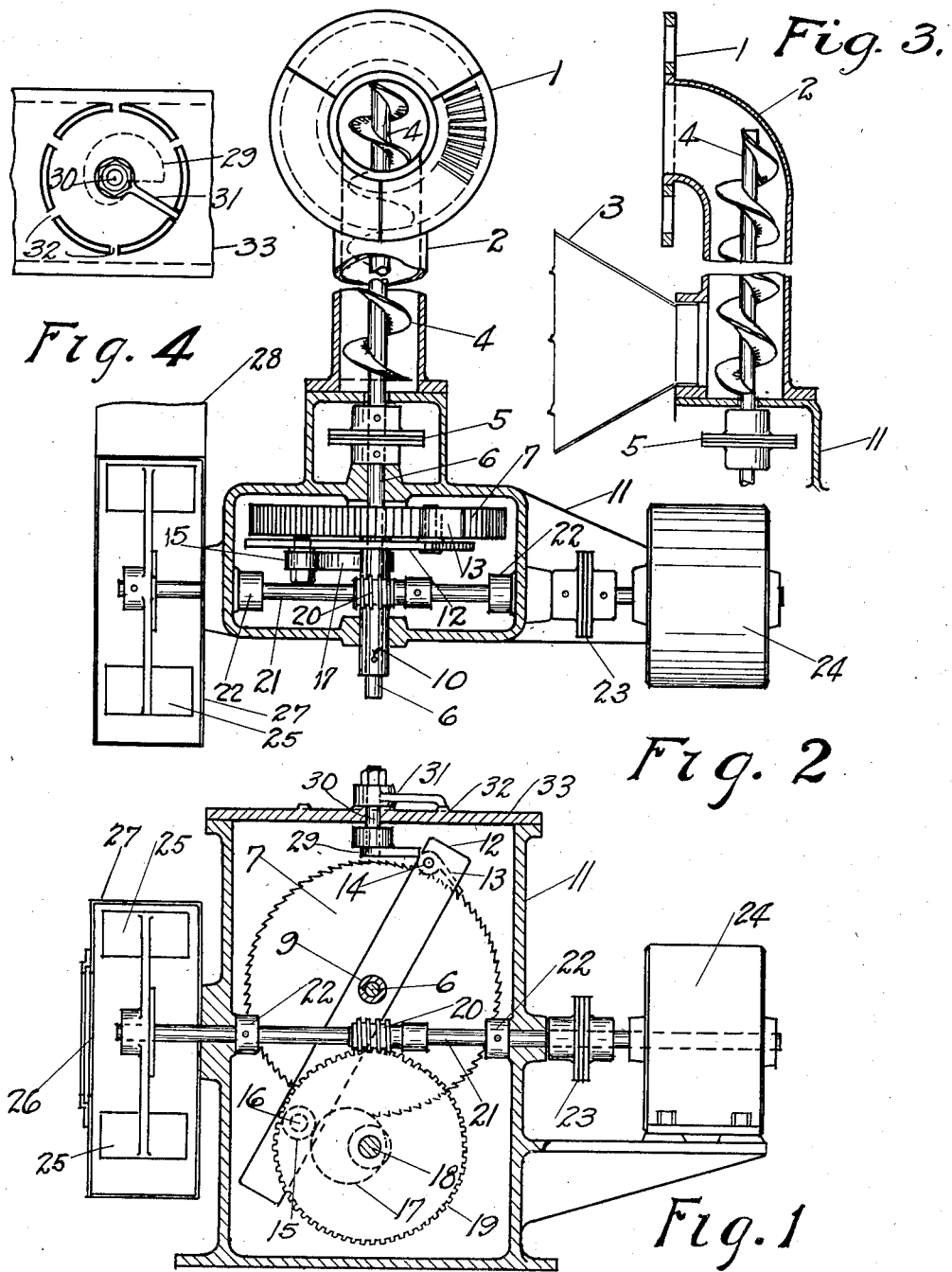
INVENTOR
Roy E. Drawz Patented Nov. 24, 1931

1,833,831

UNITED STATES PATENT OFFICE

ROY E. DRAWZ, OF MINOT, NORTH DAKOTA

COAL BURNING STOKER

Application filed August 13, 1928. Serial No. 299,295.

My invention relates to improvements in coal burning stokers. The object of my improvements are: first, to provide a coal burning stoker that is simple in construction and, cheap to manufacture; second, to provide a coal burning stoker with variable feeds with easy adjustment; third, to provide a coal burning stoker that may be easily installed through the side of the ash pit of a furnace or boiler.

I attain these objects by the mechanism illustrated in the accompanying drawings, in which:

Figure 1 is a cross section of the gear housing, the blower fan and motor support;

Figure 2 is a transverse section and partial plan view of the gear housing blower fan, screw conveyor and grate;

Figure 3 is a longitudinal section of the screw conveyor, grate and hopper;

Figure 4 is a plan view of the feed speed adjuster on the cover of the gear housing.

Similar numerals refer to similar parts throughout the several views.

The grate 1 is divided into three segments and 2 is the screw conveyor housing leading from the hopper 3 located outside the firebox to the grate 1. The screw conveyor 4 within the housing 2 is connected by a flexible coupling 5 to the driven shaft 6.

The ratchet wheel 7 is connected to the driven shaft 6 by a sleeve 9 and soft safety pin 10 of such dimension that the pin will shear off if obstructions are encountered by the screw conveyor 4.

The lever bar 12 is rotatably mounted on the extended hub sleeve 9 of the ratchet wheel 7 and has a pawl 13 pivotally connected by pin 14 to the upper end of said lever bar. The lower end portion of the lever bar 12 carries a roller 15 mounted on axle pin 16 extending from said bar, the roller having contact with the eccentric 17. The worm gear 19 and eccentric 17 are fixed to the counter shaft 18, and said counter shaft is rotatably mounted within the housing 11. The worm gear 19 operates in mesh with worm 20 fixed to a shaft 21 and said shaft is held in desired position within the housing 11 by the collars 22. The shaft 21 is connected by a coupling 23 to electric motor 24. A blower fan 25 is connected to opposite end of shaft 21.

The blower fan 25 in housing 27 is provided with a shutter 26 to control the air supply into the blower. The air duct 28 leads from the blower to the ash pit under the grates.

The feed control comprises a cam 29 that serves as a stop for the lever arm 12. The cam 29 is fixed to axle bolt or stub shaft 30 which extends through a wall 33 of the housing 11. An operating arm 31 is fixed to axle bolt or shaft 30 and adjustable to the several notches 32 to determine the speed of fuel feed to the grate.

In operation, the motor 24 rotates the shaft 21, driving the blower fan 25 and the worm gear 19. The eccentric 17, rotatably driven by the worm gear 19, causes the outward movement of the bar 11, which is held in contact with the eccentric by gravity due to the fact that the sleeve 9 is positioned upwardly of the center of the bar, which causes a to and fro motion of the lever bar 12 about the sleeve 9 as an axis. The movement of said lever bar is controlled by the cam 29 and the ratchet wheel moved forward at various speeds by a movement of one or more notches to each revolution of the eccentric 17, thus revolving the screw conveyor and forcing the fuel into the fire. A blower provides the necessary air supply for combustion.

I am aware that coal burning stokers are on the market, but not to my knowledge is my combination used and I therefore claim as follows:

1. A stoker comprising a hopper, a housing leading from the hopper, a conveyor working within the housing, a shaft for operating the conveyor, a ratchet wheel carried by said shaft, a drive shaft, a driven shaft operatively engaged with the drive shaft, a rocking member rockably mounted on said operating shaft, means actuated by the driven shaft for intermittently operating said rocking member, means carried by the rocking member for engaging the ratchet wheel upon movement of the rocking member in one direction whereby the conveyor is intermittently operated, said rocking member gravitatingly rocking in the opposite direction and a rotatable cam engageable with the rocking member for limiting the rocking movement of said member in said opposite direction.

2. In a mechanical stoker of the character described including a conveyor and a power member, a ratchet wheel rotatable with said conveyor, a pivoted lever adapted to be gravitatingly swung into substantially vertical position, a pawl carried by the upper end of said lever and engaging said ratchet wheel, means interposed in the path of said lever whereby to limit the swinging movement of said lever by gravity in one direction, and means operatively engaging with said power means and engaging said lever whereby to swing said lever in the opposite direction for periodic partial rotation of said ratchet wheel and conveyor.

ROY E. DRAWZ.